United States Patent [19]
Chheda et al.

[11] Patent Number: 5,946,621
[45] Date of Patent: Aug. 31, 1999

[54] METHOD OF OPTIMIZING NEIGHBOR SET DURING SOFT HANDOFF OF A MOBILE UNIT IN A CDMA CELLULAR ENVIRONMENT

[75] Inventors: Ashvin Chheda, Dallas; Ahmad Jalali, Plano, both of Tex.

[73] Assignee: Northern Telecom Limited, Montreal, Canada

[21] Appl. No.: 08/738,873

[22] Filed: Oct. 28, 1996

[51] Int. Cl.⁶ .................................................. H04Q 7/22
[52] U.S. Cl. ........................ 455/440; 455/442; 370/332
[58] Field of Search .................................. 455/440, 442; 370/331, 332, 334

[56] References Cited

U.S. PATENT DOCUMENTS 5,390,339   2/1995   Bruckert et al. ........................ 455/440
5,577,022   11/1996  Padovani et al. ....................... 370/332

*Primary Examiner*—Andrew M. Dollnar
*Attorney, Agent, or Firm*—Haynes and Boone, L.L.P.

[57] ABSTRACT

System and method for optimally updating a neighbor set for use by a mobile unit during soft handoff of the mobile unit in a CDMA cellular telephone environment is disclosed. A two-step process is used to ensure that the individual neighbor sets of active set members are combined in a manner such that only pilots representing the more important sectors are included in the updated neighbor set and pilots representing the less important sectors are excluded therefrom. In the first step, active set members whose RTD is more than twice as great as an OWD threshold are eliminated from consideration. In the second step, the neighbor set of the mobile unit is updated using the sectors included in the individual neighbor sets of the active set members that were not excluded by the first step, wherein those sectors are included in the updated neighbor set according to the number of individual sets in which they are found and their priority within those sets. In an alternative embodiment, a combined carrier-to-interference ratio for each of the individual neighbor set members is also used in updating the neighbor set. In an alternative embodiment, the individual neighbor set of the active set member having the shortest RTD is used as the updated neighbor set.

31 Claims, 3 Drawing Sheets

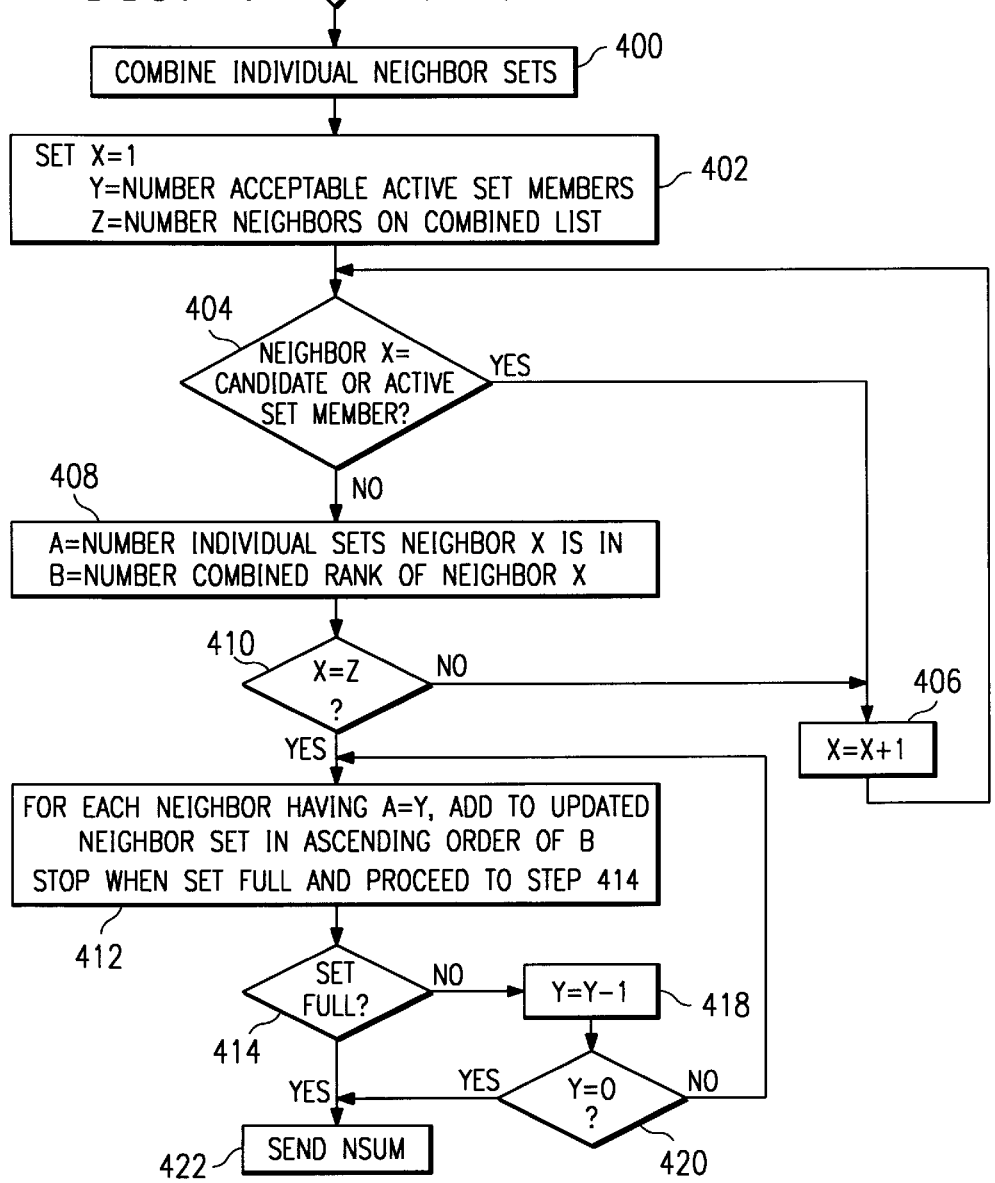

METHOD OF OPTIMIZING NEIGHBOR SET DURING SOFT HANDOFF OF A MOBILE UNIT IN A CDMA CELLULAR ENVIRONMENT

TECHNICAL FIELD

The invention relates generally to code division multiple access ("CDMA") cellular telephone systems and, more particularly, to a method of optimally updating the neighbor set during soft handoff in a CDMA cellular telephone system.

BACKGROUND OF THE INVENTION

In cellular telephone systems, the served area is divided into cells, each of which may be further divided into sectors. Each cell is served by a single base station and all of the base stations are connected to a message switching center ("MSC") via a base station controller ("BSC") and hardware links. A plurality of mobile units are connected to the MSC by establishing radio links with one or more nearby base stations.

In earlier cellular telephone technology, such as time division multiple access ("TDMA"), as a mobile unit traveled from one cell to another, the radio link between the mobile unit and the base station serving the first cell had to be broken then replaced by a radio link between the mobile unit and the base station serving the second cell. In contrast, in a code division multiple access ("CDMA") cellular telephone system, because the same frequency band is used for all cells and sectors, the first link need not be broken before connecting with the second link. The CDMA waveform properties that provide processing gain are also used to discriminate between signals that occupy the same frequency band. A mobile unit thus need not switch frequencies when a call is transferred from one cell or sector to another. Additional details regarding the specifics of the CDMA cellular telephone environment are described in TIA/EIA/IS-95-A, *Mobile Station-Base Station compatibility Standard for Dual-Mode Wideband Spread Spectrum Cellular System* (hereinafter "CDMA Standard"), which is hereby incorporated by reference in its entirety.

In the context of a cellular telephone system, "handoff" is the process of handing over a call from one sector to another when a mobile unit detects that acceptable communication with the other sector is possible. This occurs mainly when the mobile unit nears a sector boundary or the current communication link is weakened by radio frequency ("RF") shadowing and another potential communication path from another sector is enhanced. In general, handoff consists of three phases. During the first phase, referred to as "handoff initiation," the handoff process is triggered. During the second phase, referred to as "target selection," a determination is made which sectors are candidates for receiving the handoff. During the third and final phase, referred to as "handoff completion," the mobile unit is transferred from the old sector to the new sector.

The term "soft handoff" is commonly used to refer to a handoff in which the mobile unit commences communication with a new base station without interrupting communications with the old base station, i.e., the call is maintained on both base stations. If there are three cells involved in the handoff, the call will be maintained by all three base stations. A "softer handoff" refers to a handoff in which the call is maintained on one base station for different sectors of the same cell. A hybrid form of the previously discussed types of handoff, referred to as a "soft/softer handoff", results if there are two sectors from one cell and another sector from another cell involved in the handoff, in which case two base stations are involved. The terms "handoff" and "soft handoff" will hereinafter be used interchangeably to refer to all of the foregoing types of handoff.

Each sector of the CDMA system continuously outputs its own unique pilot signal. A mobile unit can distinguish between the sectors by the pilot signals emitted thereby and can also measure the strength of the pilot signal by measuring the carrier-to-interference ratio ("C/I") thereof. The strength of the pilot will indicate whether or not the sector with which it is associated can be used by the mobile unit to establish communication.

To successfully complete a soft handoff, the mobile unit must detect suitable sectors for handoff and keep track of sectors with which it is currently in communication. In other words, successful handoff involves determining the point at which a sector can communicate acceptably with the mobile unit, as well as the point at which a sector can no longer be used by the mobile unit. This is accomplished by the mobile unit's continuously measuring the strengths of the pilot signals of the sectors of interest. Since the mobile unit can generally only search sectors one at a time, the searching is governed by a set of rules.

In particular, the mobile unit searches for pilot signals on the current CDMA frequency assignment to detect the presence of pilot signals and then measures their strengths. When the mobile unit detects a pilot of sufficient strength, meaning that it has a C/I above a certain minimum "ADD threshold", that is not associated with any of the forward traffic signals currently assigned to it, it sends a "pilot strength measurement message" ("PSMM") to the sector(s) with which it is currently in communication. The BSC will then assign a forward traffic channel associated with that pilot signal through the base station to the mobile unit and direct the mobile unit, via a "handoff direction message" ("HDM"), to perform a handoff. The mobile unit acknowledges the HDM with a "handoff completion message" ("HCM") and begins communicating with the new sector while maintaining communication with the old sector(s). In the event that the C/I of one of the sectors with which the mobile unit is communicating drops below a "DROP threshold" and stays below that threshold for a time of "T-TDROP" seconds, the mobile unit sends a PSMM to the sector(s) with which it is currently communicating and the BSC will direct the mobile unit, via an HDM, to drop the weak sector. Receipt of the HDM is acknowledged by the mobile unit with an HCM.

The pilot signal search parameter rules are expressed in terms of various "sets" or "lists" of pilots, and sectors represented thereby, which include an "active set," a "candidate set," a "neighbor set," and a "remaining set." The active set comprises the pilots associated with sectors currently in communication with the mobile station. The candidate set comprises pilots that are not currently in the active set, but that have been received by the mobile unit at a strength sufficient to indicate successful communication. The neighbor set comprises the pilots that could be received with sufficient strength to enable successful communication; that is, pilots whose C/I can exceed the ADD threshold. Active and candidate set pilots will most likely have come from the neighbor set and pilots that are dropped from the active and candidate sets are placed in the neighbor set. The remaining set comprises all possible pilots in the system on the current CDMA frequency assignment, excluding those pilots in the active, candidate and neighbor sets. The active and candidate sets can include a maximum of six (6) and five (5) pilots, respectively, while the neighbor set maximum is typically twenty (20) pilots.

Throughout a call in progress, the mobile unit searches and measures the strength of the pilots in the various sets; however, the mobile unit searches the active set most often, as the maintenance of the call undoubtedly depends most heavily on the sectors in the active set. The candidate set is also searched fairly often, although not as often as the active set. The neighbor set is searched even less often than the candidate set. For obvious reasons, the remaining set is rarely searched as compared to the other sets, and, since the remaining set is far larger than the other sets, the time between remaining set pilot searches is much longer than the time between neighbor set pilot searches.

Each time the mobile unit is ordered to add and drop pilots, the neighbor set will likely need to be updated, a task which is performed by the BSC. The updated neighbor set is sent as a "neighbor list update message" ("NLUM") as regular traffic on the communication link between the sector (s) with which the mobile unit is currently communicating and the mobile unit itself.

In a CDMA cellular telephone system, efficiently performing a soft handoff involves optimizing the choice of pilots and sectors to be included in the neighbor set. The inability to optimize the neighbor set is detrimental to the overall performance of the system, the direct impact of which is an increase in the number of dropped calls and a decrease in call quality. Accordingly, optimization is crucial in at least two regards. First, the erroneous inclusion of a pilot in the neighbor set will undoubtedly cause the mobile unit to waste valuable time searching for this pilot. Moreover, since the neighbor set is usually constrained in size to minimize the overall time searching for favorable neighbors to which to handoff a call, a valuable slot is effectively wasted. Still further, the erroneous exclusion of the sector from the neighbor set, i.e., the inclusion of it in the remaining set, increases the likelihood of a call being dropped, as remaining set members are rarely scrutinized. Accordingly, a potential neighbor set member that is erroneously included in the remaining set will most likely be ignored until it is too late.

At this point, an explanation of why the call quality and probability of maintaining a call is detrimentally affected by a less than optimal neighbor set is deemed to be appropriate. In particular, if a sector is favorable for handoff, as indicated by a strong pilot signal, but the pilot is not detected during a search because it was erroneously excluded from the neighbor set, one of several situations will result. First, as the mobile unit continues to move, the pilots in the active set will lose strength due to the contribution of the undetected favorable pilot as interference. On the other hand, if the undetected pilot is detected and added to the active set, although the other pilots will continue to lose strength, call quality will be maintained or improved, as the favorable pilot is now involved in the communication. Second, as the mobile unit moves and the undetected pilot increases in strength, the sectors included in the active set might be too weak to sustain adequate communication, resulting in the call being dropped. Finally, if the undetected pilot is finally detected as the mobile unit is moving, a PSMM will be sent; however, if the communication link has been degraded beyond a certain point, the HDM sent by the active sector(s) instructing the mobile unit to add the new sector to its active set will not be received and the call will be dropped.

For each individual sector in the system, a neighbor set is determined and its members prioritized or ranked in order of importance based primarily on the position and direction of the antenna of the potential neighbor set member, the distance of the potential neighbor set member from the sector of interest and the effects of shadowing in the path therebetween. For example, referring to FIGS. 1A and 1B, in which each sector, such as a sector S, is represented by a hexagon, and wherein each cell, such as a cell C (FIG. 1A), comprises three sectors, one or more antennas for each sector are located at or about a point P (FIG. 1A) in the center of the cell C and are aimed at the opposite corner of the sector. For example, with respect to the sector S, its antenna or antennas are aimed in a direction represented by an arrow A such that the pilot of the sector S is strongest in the direction indicated by the arrow A.

As previously indicated, to determine which sectors are "important" neighbors, proximity information, antenna position and direction and shadowing effects must be considered. A sector displaced from the sector of interest by two other sectors may be important if its antenna is pointing in the direction of the sector of interest and there is minimal shadowing in the path therebetween. FIG. 1B illustrates the neighbor set of the sector S, in which the relative priority or ranking of each neighbor set member is represented by a number therein. For example, a sector labeled "1" has a priority of 1 in the neighbor set of the sector S. It will be easily recognized that the sectors bordering the sector S to the left and right thereof have a priority of 1, due to their proximity to the sector S and not unfavorable antenna directivity. The two sectors immediately below the sector S have a priority of 2, due also to their proximity and not unfavorable antenna directivity. In contrast, the two sectors immediately above the sector S have a priority of 7. This is due to the fact that, although the sectors are proximate to the sector S, their antennas point directly away from the sector S. Conversely, the sector above these two sectors, although not as close to the sector S, has its antenna pointed directly toward the sector S, and therefore has a priority of 3.

As illustrated above, each individual sector has its own neighbor set which may be empirically identified and prioritized through observation and measurement of pilot signal strength, antenna position and direction, the distance between the sectors, and the effect of shadowing in the path therebetween. Determining the neighbor set to be used when the mobile unit is in handoff between two or more sectors poses a more difficult problem. The apparent solution would be simply to combine the individual neighbor sets of the sectors involved in the handoff; i.e., the sectors in the active set. However, because the maximum size of the neighbor set sent by the BSC is limited to twenty (20), and because it is possible that one or more sectors in the active set might lie a considerable distance from the mobile unit, making its neighbors effectively useless, this "solution" is clearly deficient.

Accordingly, what is needed is a method of optimizing the neighbor set when a mobile unit is in handoff.

SUMMARY OF THE INVENTION

The present invention, accordingly, provides a system and method for optimally updating a neighbor set for use by a mobile unit during soft handoff of the mobile unit in a CDMA cellular telephone environment. In a departure from the art, the neighbor sets of active set members are combined in a manner such that only pilots representing "important" sectors, that is, sectors that are more likely to be involved in a subsequent soft handoff, due either to the positioning of its antenna or its proximity to the active sectors, are included in the updated neighbor set, and pilots representing "unimportant" sectors are excluded therefrom.

In a preferred embodiment, in a first step of the method of the present invention, a round-trip delay ("RTD"), which is a measure of twice the distance between a sector of interest and the mobile unit, is calculated for each active set member by the corresponding base station to determine proximity information. From the RTD, a one-way delay ("OWD") for the sector is calculated by dividing the RTD by two. The OWD for the sector is then compared to a preselected OWD threshold and, if it exceeds the threshold, that sector's individual neighbor set will not be considered in updating the neighbor set.

Once a determination is made which individual neighbor sets are to be considered in updating the neighbor set, in a second step of the method of the present invention, the updated neighbor set is actually determined. Using an overlap technique, the neighbor set of each sector in the active set that was not excluded by the first step is examined. For each sector that is common to all of the individual neighbor sets, a "combined rank" is calculated by adding the priority number, or rank, of that sector in each of the individual sets and these sectors are included in the updated neighbor set in the order indicated by their combined ranks, respectively. The same steps are then taken with respect to sectors that are common to all but one neighbor set, then all but two neighbor sets, and so on until the updated neighbor set is completed and prioritized.

In an alternative embodiment, upon completion of the first step described above, in a second step of the method, the neighbor sets of the active sectors having OWDs that fall within the OWD threshold are combined using an averaging technique, which will be explained using an example in which there are three individual neighbor sets to be combined. First, for each sector that is common to all three individual sets, an average rank is calculated by computing the average of the sector's rank from each of the individual sets and the sectors are included in the updated neighbor set according to their average ranks. Next, for each of the sectors that are common to all but one of the individual neighbor sets, an average rank is calculated by dividing by three the sum of the sector's ranks from the two individual sets and a constant X. These sectors are then also added to the updated neighbor set in the order of their average ranks. Finally, if there are any slots remaining in the updated neighbor set, for each of the sectors that are common only to one of the individual sets, an average rank is calculated by dividing by three the sum of the sector's rank from the individual set, the constant X and a constant Y. The sectors are then added to the updated neighbor set in the order of their average ranks until the set is filled.

In another alternative embodiment, if there are two or more sectors in the active set, the neighbor set of the active set member having the shortest RTD is used.

A technical advantage achieved with the invention is that it ensures that all "important" neighbors will be included in the updated neighbor set used by the mobile unit during soft handoff.

A technical advantage achieved with the invention is that it ensures that no "unimportant" neighbors will be included in the updated neighbor set used by the mobile unit during soft handoff.

BRIEF DESCRIPTION OF THE DRAWINGS

FIG. 4 is a flowchart of a second step of the present invention using an overlap technique.

FIG. 5 is a table of exemplary active set members and their associated rank.

DESCRIPTION OF THE PREFERRED EMBODIMENT

Figure 1:
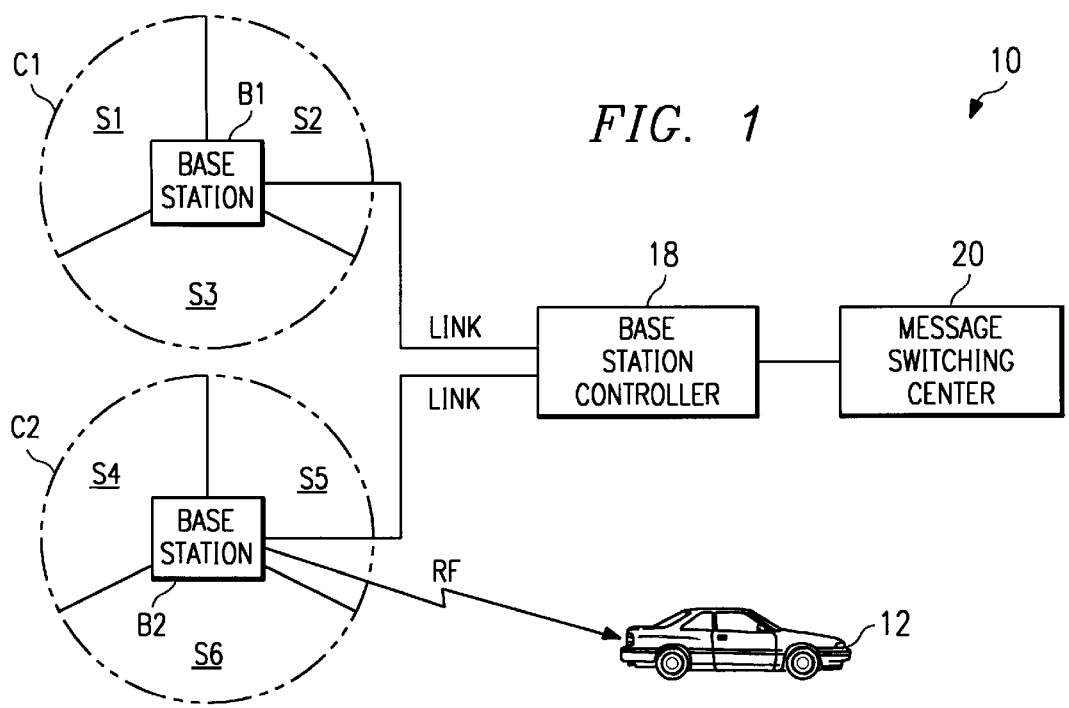
FIG. 1 is a system block diagram of a CDMA cellular telephone system for implementing the neighbor set optimization method of the present invention.
Figure 1A:
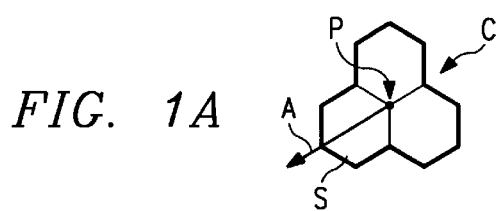
FIGS. 1A and 1B illustrate the concept of a neighbor set of a sector.
Figure 1B:
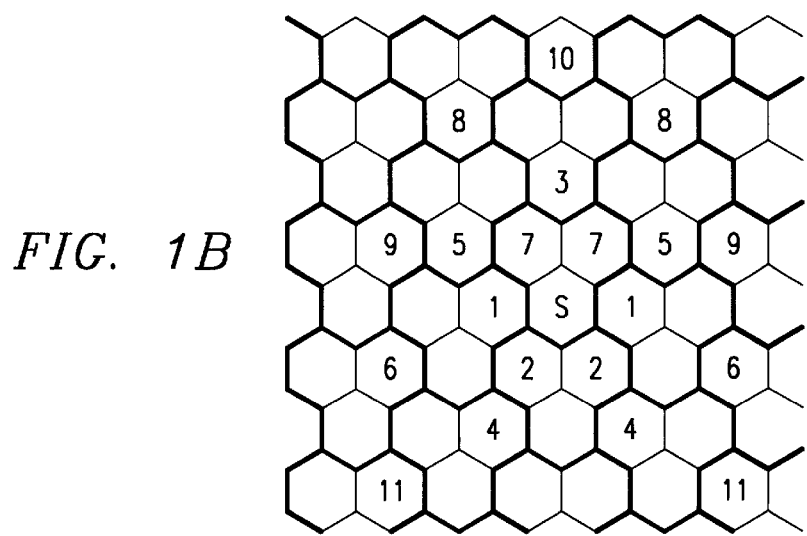

In FIG. 1, a CDMA cellular telephone system for implementing the neighbor set optimization method of the present invention is designated generally by a reference numeral 10. In a preferred embodiment, the system 10 is comprised of a plurality of cells, represented in FIG. 1 by cells C1 and C2. Each of the cells C1, C2, is divided into a plurality of sectors S1–S3 and S4–S6, respectively, through use of a directional antenna (not shown). Although the cells C1, C2 are shown as being divided into three sectors, it will be recognized by those skilled in the art that cells may S be subdivided into one or more sectors depending on the configuration of the system 10. Each cell C1, C2, comprises a base station B1, B2, respectively, the primary function of which is to provide over-the-air radio frequency ("RF") communication with mobile units, such as a mobile unit 12.

Each base station B1, B2, is further connected via a link to a base station controller ("BSC") 18, which is connected to a mobile switching center ("MSC") 22. As the elements comprising the system 10, as well as the configuration thereof, are well known in the art, the details thereof will not be further described, except as necessary to impart a complete understanding of the present invention.

It is well-known that shadowing effects in the system 10 enable certain sectors that lie a considerable distance from the mobile unit 12 to be used to establish suitable communication with the mobile unit 12. For reasons previously described, a sector should be included in the active set as soon as possible if its pilot is strong enough; however, that sector's individual neighbor set should not necessarily be considered when the mobile unit's 12 neighbor set is updated during soft handoff. Regardless of the method used to update the neighbor set, the neighbor set of a distant active set member has the potential to "pollute" the update process, as most sectors in its individual neighbor set will also lie a great distance from the mobile unit 12 and hence are unlikely to be important neighbors with respect to the mobile unit 12. Consequently, in a first step of the method of the present invention, a determination is made as to which sectors in the active set should be involved in the update process. Then and only then is the neighbor set actually updated using the individual neighbor sets of the acceptable active set members.

Accordingly, in a first step of the present invention, when a mobile unit, such as the mobile unit 12, is in soft handoff, a round-trip-delay ("RTD") indicative of the distance between a sector of interest and the mobile unit 12, is calculated by the appropriate base station for each of the sectors in the active set. From the RTD, a one-way-delay ("OWD") can be calculated by dividing the RTD by two. The OWD for each sector is then compared to an OWD threshold, which is typically selected to be equal to two and one half (2½) times the radius of a cell, but is programmable and may be different for each sector. If the OWD for a given sector exceeds the OWD threshold, that sector's individual neighbor set will not be used in updating the neighbor set.

Figure 2:
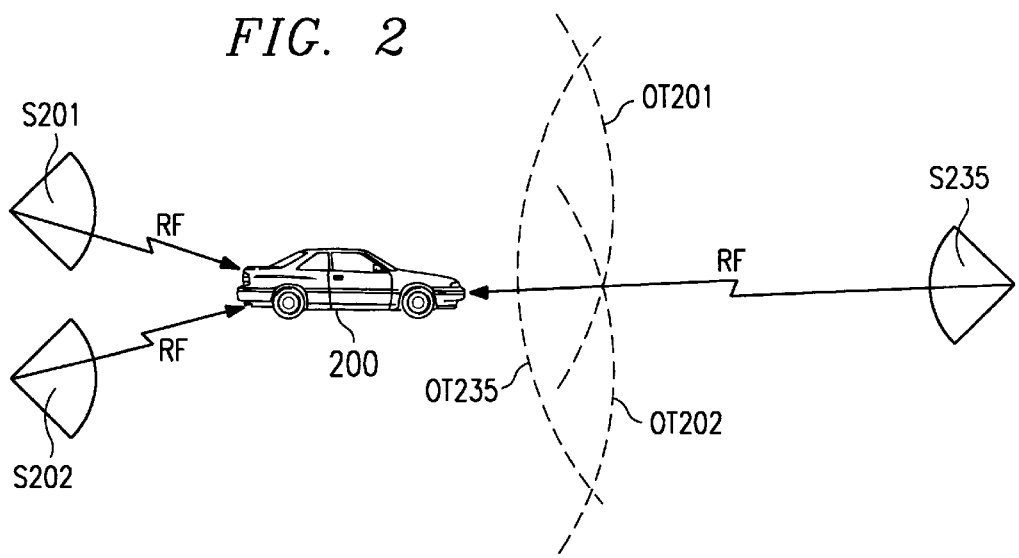
FIG. 2 illustrates an application of a first step of the optimization method of the present invention.
Figure 3:
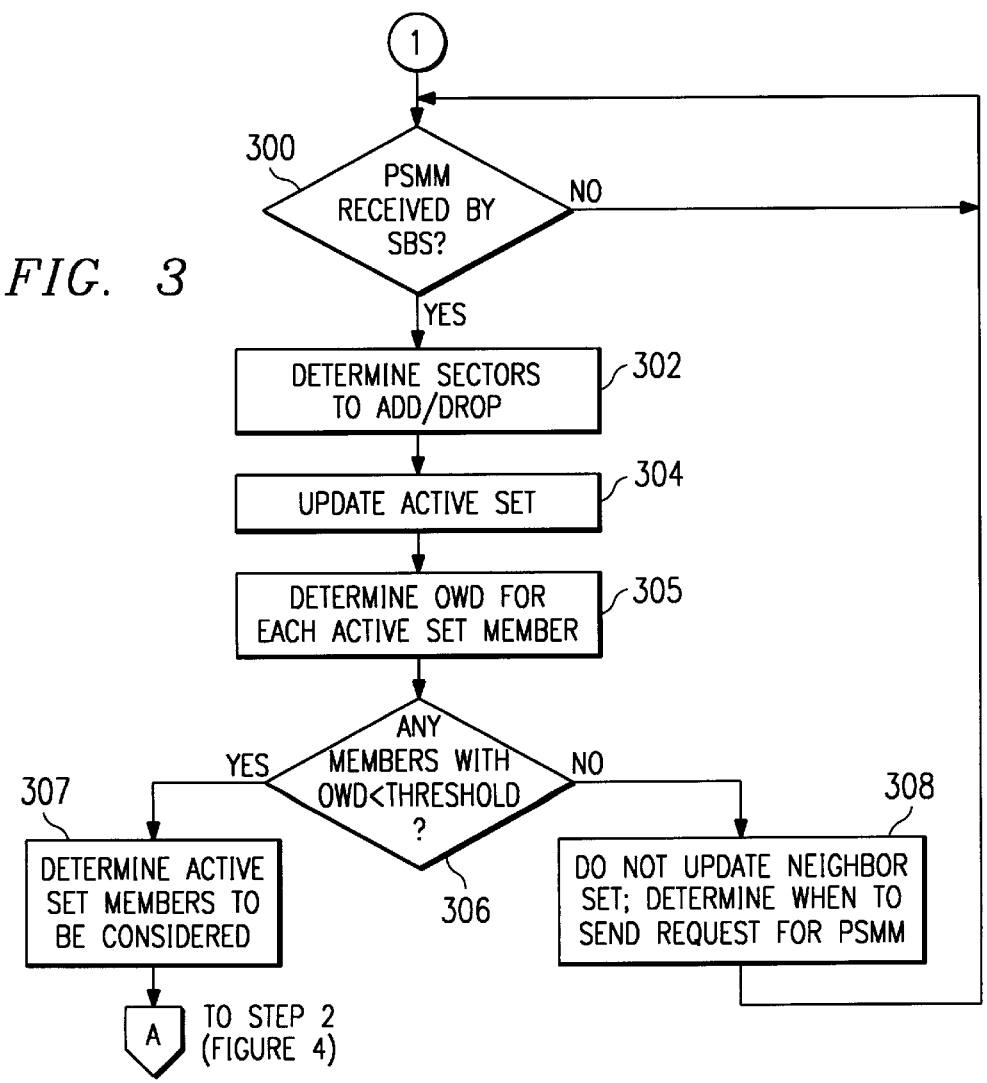
FIG. 3 is a flowchart of the first step of the present invention.

The first step of the present invention will now be explained in greater detail with reference to the example shown in FIG. 2 and the flowchart shown in FIG. 3. At the outset, it should be recognized that logic for implementing the method of the present invention as shown in FIGS. 3 and 4 is stored in the various base stations B1, B2, and/or the BSC 18 of the system 10. Referring now to FIG. 2, the mobile unit 200 is already in communication with sectors S201 and S202 and wants to go into soft handoff with sector S235. In step 300 (FIG. 3) a determination is made whether a PSMM has been relayed to sectors S201 and S202 and forwarded on to the BSC. It will be recognized, as explained above, that a PSMM is generated any time there is to be a change in the active set; i.e., any time a sector is to be added or dropped. If not, execution remains at step 300; otherwise, execution proceeds to step 302. In step 302, a determination is made which sector or sectors are to be added and/or dropped. In the example illustrated in FIG. 2, it will be assumed that the sector S235 must be added to the active set to prevent the possibility of the call being dropped. Therefore, in step 304, the active set is updated by adding sector S235 thereto.

In step 305, the OWDs between each of the active set members S201, S202, and S235 and the mobile unit 200 are determined. In step 306, a determination is made whether there are any active set members whose OWD is below the OWD threshold. In the illustrated example (FIG. 2), the OWD thresholds for sectors S201, S202 and S235 are illustrated as dashed lines OT201, OT202 and OT235, respectively. It will be recognized that the OWD between the mobile unit 200 and sectors S201, S202, lies within the respective OWD thresholds OT201, 202, for those sectors. In contrast, the OWD between the mobile unit 200 and the sector S235 clearly lies outside that sectors OWD threshold OT235. Therefore, in the example shown in FIG. 2, in step 306, the answer is "yes" and execution proceeds to step 307, in which the active set members to be considered in the update process are determined. In this case, since only sectors S201 and S202 had OWDs below the OWD threshold, they are the only sectors to be considered; sector S235 will be ignored during the update process. Execution then proceeds to the second step of the method, which is described in detail below with reference to FIG. 4. If for some reason there are no active set members with OWDs below their OWD threshold, execution would proceed to step 308, in which the neighbor set is not updated and a determination is made as to when to transmit another request for a PSMM, which would return the process to step 300. Alternatively, in step 308, if the BSC continuously monitors OWD, execution would proceed to step 306 if any mobile unit-to-base station OWD becomes appropriate.

It will be recognized that the RTD measured between a sector of interest and a mobile unit might not represent a direct line of sight communication between the mobile unit and the base station serving the sector; that is, it might not represent the shortest distance between the two points. Many times, a direct line of sight communication is prevented due to significant shadowing effects; consequently communication is accomplished using a reflected version of the signal. In such cases, the reported RTD will be greater than the actual distance between the sector and the mobile unit. It will be recognized that if the reported RTD is larger than twice the OWD threshold, then the sector's individual neighbor set will not be considered during the neighbor set update process.

If there are no sectors that are within the OWD threshold, the neighbor set is simply not updated. This shadowing situation is not permanent and, after a predetermined time period, the base station(s) can transmit to the mobile unit a Pilot Measurement Request Order ("PMRO") requesting a PSMM to determine how to update the neighbor set, expecting that by this time the shadowing effects affecting the direct line of sight communications to no longer be significant. Alternatively, if base stations alwayx monitor RTD, the BSC can update the neibhtor set (NLUM) whenever a particular base station reports adequate OWD. If there are sectors that are within the OWD threshold, the individual neighbor sets thereof are used in the update process and the exclusion of a sector because of the blocked line of sight will not significantly affect the update process. This is because all sectors involved in step two of the process are ultimately sectors that are close together, their individual neighbor sets include most of the same neighbors. If the distance between a sector and the mobile unit is greater than the OWD threshold, then any error in the reported RTD will have no effect, as the error increases the RTD from the true value.

It is not necessary that the mobile unit know the RTD values, since the neighbor set is updated at the BSC side. Depending on the manufacturer of the base station, a determined maximum number of signals from the mobile can be demodulated at the same time. The multipath signals contain essentially the same information from the mobile unit that the base station attempts to add together by various techniques to maximize the signal energy. Each of these multipath signals arrive at slightly different times and along different routes. In this situation, the shortest RTD should be used in step one.

The second step of the method comprises the actual update process and can be performed in any number of manners; however, in a preferred embodiment, an "overlap technique," as described below with reference to FIG. 4, is used. In general, the overlap technique treats sectors that are common to all of the individual neighbor sets of "acceptable" active set members (i.e., active set members whose OWD is less than the OWD threshold) as being more important, or relevant, than sectors that are common only to one individual neighbor set. In other words, the more individual neighbor sets, or lists, a sector is on, the more important it is to the updated neighbor set and vice versa.

As has been previously noted, and as is well known, sectors are prioritized within the neighbor set of another sector in order of importance thereof with respect to that sector. Therefore, within a single neighbor set, a neighboring sector, or "neighbor," having a priority number, or rank, of "1" is of greater significance than a neighbor having a rank of "5". The relative importance of a sector depends not only on proximity information, but also antenna position, antenna direction and shadowing effects. For example, a sector that is displaced from the sector of interest by at least two other sectors might still be important if its antenna is pointing directly toward the sector of interest and there is minimal shadowing in the path therebetween. It will be recognized that the ranks could also be assigned in ascending order, wherein a rank of "5" would be of higher priority than a rank of "1", in which case the algorithm would be modified appropriately.

The overlap technique will now be explained in greater detail with reference to FIGS. 4 and 5. Referring to FIG. 4, in step 400, the individual neighbor sets of acceptable active set members are combined. In step 402, a variable "X" is set equal to 1 to be used as a pointer into the combined neighbor set created in step 400, a variable "Y" is set equal to the number of acceptable active set members and a variable "Z" is set equal to the total number of neighbors to be considered. For example, if there are three acceptable active set members each having a twenty-member neighbor set, Y would equal 3 and Z would equal 60.

In step 404, a determination is made whether neighbor X is also another active or candidate set member. If so, that neighbor is skipped, since by definition, active and candidate set members cannot be neighbor set members, and execution proceeds to step 406, in which X is incremented by 1, and then returns to step 404. If in step 404 it is determined that neighbor X is not an active or candidate set member, execution proceeds to step 408.

In step 408, a variable "A" is set equal to the number of individual neighbor sets in which neighbor X is included and a variable "B" is set equal to a combined rank calculated for neighbor X by adding its rank from each individual neighbor set. This information is stored in connection with neighbor X. In step 410, a determination is made whether X is equal to Z. If not, meaning there are more neighbors remaining, execution returns to step 406; otherwise, execution proceeds to step 412. In step 412, each neighbor having A equal to Y is placed on the updated neighbor set in ascending order of B. In step 414, a determination is made whether the neighbor set is full. If not, execution proceeds to step 418, in which Y is decremented by 1, and then to step 420, in which a determination is made whether Y is equal to zero. If so, execution proceeds to step 422, in which an NSUM is sent. Similarly, if in step 414, or step 412 during updating, it is determined that the neighbor set is full, execution proceeds to step 422.

In summary, using the overlap technique, neighbors that are also candidate or active set members are eliminated from consideration and then remaining neighbors are included in the updated neighbor set first in order of the number of individual neighbor sets in which they are included and then in order of the sum of their ranks within the individual sets. Referring now to FIG. 5, an example will be presented.

In the example shown in FIG. 5, there are four active set members; namely, sectors 10, 7, 28 and 21, each having a neighbor set comprising the maximum number of members, in this case seven. It will be assumed that the first step of the method of the present invention, as illustrated in FIG. 3, has already been performed and that sector 28 did not meet the OWD threshold condition; therefore, only neighbors in the neighbor sets of sectors 10, 7 and 21 will be considered for inclusion in the updated neighbor set. The first neighbor, sector 21, which is priority 1 in the individual neighbor set of sector 10, and second neighbor, sector 7, which is priority 2 in the individual neighbor set of sector 10, are eliminated because they are also active set members. The third neighbor, sector 14, is included on two lists (A=2) and has a combined rank of 7 (B=3+4=7). The fourth neighbor to be considered, sector 23, is included on three lists (A=3) and has a combined rank of 15 (B=4+4+7=15). Table I below lists the values for number of lists and combined rank for all of the sectors to be considered:

TABLE I

| Sector | #Individual Sets (A) | Combined Rank (B) |
| --- | --- | --- |
| 14 | 2 | 7 |
| 23 | 3 | 15 |
| 11 | 1 | 5 |

TABLE I-continued

| Sector | #Individual Sets (A) | Combined Rank (B) |
| --- | --- | --- |
| 12 | 1 | 6 |
| 6 | 3 | 13 |
| 8 | 1 | 6 |
| 9 | 1 | 7 |
| 19 | 1 | 5 |
| 20 | 1 | 6 |

The updated neighbor set shown below in Table II is filled in as follows. As shown in Table I, two of the neighbors (sectors 6 and 23) are included in all three sets. Between these two, sector 6, having a combined rank of 13, is of higher priority than sector 23, which has a combined rank of 15. The sectors that are included in two neighbor sets are considered next. The only sector that meets this criterion is sector 14, which is placed in the updated neighbor set as priority 3. Finally, sectors that are included in only one individual set are considered in order of combined rank and the list is completed with sector 11 (combined rank of 5) being placed in the updated set at priority 4, sector 19 (combined rank of 5) placed in the updated set at priority 5, sector 12 (combined rank 6) placed in the updated set at priority 6 and sector 8 (combined rank 6) placed in the set at priority 8. It will be recognized that the updated neighbor set priorities of sectors 11 and 19 could be exchanged, as they are both included in one individual neighbor set and have a combined rank of 5. The same holds true for sectors 12 and 8. It will also be noted that sectors 8 and 9 are also included in the neighbor set of sector 28; however, this sector was eliminated from consideration not meeting the OWD threshold condition.

The updated neighbor set created using the overlap method is shown below in Table II:

TABLE II

| Rank | Sector |
| --- | --- |
| 1 | 6 |
| 2 | 23 |
| 3 | 14 |
| 4 | 11 |
| 5 | 19 |
| 6 | 12 |
| 7 | 8 |

Although sector 20 has the same combined rank as sectors 12 and, it is not included in the updated neighbor set shown in Table II because the updated set is completed before sector 20 comes up for consideration.

In an enhancement to the above-illustrated overlap technique, rather than simply adding sectors to the updated neighbor set in the order in which they are considered, neighbors are first grouped according to the number of individual sets (A) in which they are included. Starting again with the group having the largest A, any neighbor having the same combined rank (B) will be further ranked by adding the pilot C/I of the active set members whose individual neighbor sets they originate from and, if required, weighted by the neighbor's rank in each individual set, to determine a combined C/I for the neighbor. Neighbors are then included in the updated neighbor list in descending order of A, ascending order of B, and descending order of combined C/I. It will be recognized that the pilot C/I for each active set member can be obtained from the most recent PSMM.

To illustrate, referring to the example shown in FIG. 5 and Table I above, considering all neighbors included in only one individual neighbor set (A=1) and having a combined priority of 5 (B=5), i.e., sectors 11 and 19, assuming that the C/I of sector 10 (the active set from whose neighbor set sector 11 originates) is MMdB and the C/I of sector 21 (the active set from whose neighbor set sector 19 originates) is NNdB, where MM<NN, sector 19 would have a higher priority in the updated neighbor set than sector 11. Referring to Table II, the priorities of sectors 11 and 19 would be reversed. Similarly, with respect to neighbors included in one neighbor set (A=1) and having a combined priority of 6 (B=6), i.e., sectors 12, 8 and 20, which originate from the neighbor sets of sectors 10, 7 and 21, respectively, assuming the C/Is of sectors 10, 7 and 21 are respectively AAdB, BBdB and CCdB, where AA<BB<CC, sector 20 would have a higher priority in the updated neighbor set than sector 8 and sector 12 would not be included in the updated neighbor set, as it would already be completed by the time sector 12 would be considered. Referring to Table II, sector 20 would be included in the updated neighbor set in place of sector 12.

As suggested above, in cases where neighbors having the same combined rank originate from the neighbor set of more than one acceptable active set member, the C/I of those active set members are averaged to generate the combined C/I for the neighbor. Alternatively, the C/I of the relevant active set members could be weighted by the rank of the neighbor within that active set member's active set prior to averaging. For example, assuming there are two sectors, e.g., sectors 100 and 101, for which A=2 and B=5. Assuming further that sector 100 has a rank of 1 in the neighbor set of a first active set member whose C/I is $P_1$ and a rank of 4 in the neighbor set of a second active set member whose C/I is $P_2$, and that sector 101 has a rank of 3 in the neighbor set of the first active set member (C/I=$P_1$) and a rank of 2 in the neighbor set of a third active set member whose C/I is $P_3$, if:

$$(1P_1+4P_2)>(3P_1+2P_3)$$

then sector 100 will be added to the updated neighbor set before sector 101. Conversely, if:

$$(1P_1+4P_2)<(3P_1+2P_3)$$

then sector 101 will be added to the updated neighbor set before sector 100.

In an alternative embodiment, the second step of the method of the present invention is performed using an "averaging" technique, which will be explained in detail with reference to the example set forth in FIG. 5. For each sector included in all neighbor sets of acceptable active set members, in this case, sectors 6 and 23, an average rank is calculated by taking an average of the sum of its ranks within each individual neighbor set. In this case, sector 6 has an average rank of 4.33 ((7+3+3)/3) and sector 23 has an average rank of 5 ((4+4+7)/3). For each sector included in all but one neighbor set, an average rank is calculated by taking an average of the sum of its ranks within each individual neighbor set plus a constant "V," which is selected to be fairly high, e.g., the number of members in a neighbor set plus 1. Assuming V equals 8, sector 14 has an average priority of 5 ((3+4+8)/3). For each sector included in all but two individual neighbor sets, an average rank is calculated by taking an average of the sum of its rank in the individual neighbor set plus V plus a constant "W," e.g., twice the number of members in a neighbor set plus 1. Assuming W equals 15, sectors 11 and 19 both have an average rank of 9.33 ((5+8+15)/3) and sectors 12, 8 and 20 each have an average rank of 9.66 ((6+8+15)/3).

Table III below lists the values for number of lists and average rank for all of the sectors to be considered:

TABLE III

| Sector | # Individual Sets | Average Rank |
| --- | --- | --- |
| 14 | 2 | 5 |
| 23 | 3 | 5 |
| 11 | 1 | 9.33 |
| 12 | 1 | 9.66 |
| 6 | 3 | 4.33 |
| 8 | 1 | 9.66 |
| 9 | 1 | 10 |
| 19 | 1 | 9.33 |
| 20 | 1 | 9.66 |

The sectors are then placed in the updated neighbor set in order of ascending average rank, as shown below in Table IV:

TABLE IV

| Rank | Sector |
| --- | --- |
| 1 | 6 |
| 2 | 23 |
| 3 | 14 |
| 4 | 11 |
| 5 | 19 |
| 6 | 12 |
| 7 | 8 |

A brief perusal of Tables II and IV reveals that, in the illustrated example, both the overlap method and the averaging method yield identical updated neighbor sets. It will be recognized that the values selected for the constants V and W will determine where in the updated neighbor set sectors that are included in less than all of the individual neighbor sets will fall. Very high values for V and W will ensure that such sectors are lower in priority than sectors that are included in all individual sets, while low values for V and W will result in such sectors being intermingled with sectors that are included in all individual sets.

In a variation of the averaging technique, the constants V and W are constantly updated by adaptive methods to optimize the system; however, this variation would require considerably more processing time.

In yet another alternative embodiment, the second step of the method of the present invention is performed by simply utilizing the neighbor set of the active set member with the shortest RTD.

In an enhancement to the above-described method of using the neighbor set of the active set member having the shortest RTD, if the BSC continuously monitors the RTD of every sector in the mobile unit's active set, it inherently knows when another sector becomes the sector with the shortest RTD. In such a situation, the BSC can send an NLUM containing the neighbors of this new shortest RTD sector. To avoid a ping-pong effect, the difference between this new sector's current RTD and the current RTD of the sector that previously had the shortest RTD must be above a certain programmable minimum threshold. This will ensure that the RTD between the mobile unit and the new sector is truly indicative of the mobile unit's being closer to the new sector. Using this enhancement, the base station need not wait for a PSMM before going through the routine of determining the new neighbor set.

Although an illustrative embodiment of the invention has been shown and described, other modifications, changes, and substitutions are intended in the foregoing disclosure.

Accordingly, it is appropriate that the appended claims be construed broadly and in a manner consistent with the scope of the invention.

What is claimed is:

1. In a code division multiple access ("CDMA") cellular telephone system, a method of optimizing an updated neighbor set used by a mobile unit during soft handoff thereof, the method comprising the steps of:

(a) determining a one-way-delay ("OWD") of each sector in an active set of said mobile unit;

(b) eliminating from consideration an individual neighbor set of any sector in said active set of said mobile unit having an OWD that is greater than a preselected OWD threshold, wherein said active set sectors having OWDs that are not greater than said preselected OWD threshold comprise acceptable active set sectors and individual neighbor sets associated with said acceptable active set sectors comprise acceptable neighbor sets; and (c) forming an updated neighbor set for use by said mobile unit comprising neighbor sectors included in at least one of said acceptable neighbor sets.

2. The method of claim 1 wherein step (b) further comprises:

selecting the one of said acceptable active set sectors that has the shortest OWD; and using said individual neighbor set of said selected acceptable active set sector as said updated neighbor set.

3. The method of claim 1 wherein within each of said individual neighbor sets, each neighbor sector comprising said individual neighbor set is assigned a rank, and wherein step (b) further comprises:

for each neighbor sector included in at least one of said acceptable neighbor sets, determining a number indicating in how many of said acceptable neighbor sets said neighbor sector is included and calculating an updated rank for said neighbor sector from said ranks of said neighbor sector within said acceptable neighbor sets; and adding said neighbor sectors to said updated neighbor set in an order determined at least partially by said updated rank until said updated neighbor set is full.

4. The method of claim 3 wherein said step of calculating comprises adding said ranks of said neighbor sector in said acceptable neighbor sets, said updated rank being equal to the sum of said ranks of said neighbor sector in said acceptable neighbor sets.

5. The method of claim 3 wherein said step of calculating comprises computing an average of said ranks of said neighbor sector in said acceptable neighbor sets, said updated rank being equal to said average of said ranks of said neighbor sector in said acceptable neighbor sets.

6. The method of claim 5 wherein said step of calculating further comprises:

calculating a difference between the number of acceptable neighbor sets in which said neighbor sector is included and the total number of said acceptable active set sectors;

if said difference is zero, averaging said ranks of said neighbor sector in said acceptable neighbor sets to obtain said updated rank; and if said difference is greater than zero, adding said ranks of said neighbor sector in said acceptable neighbor sets with a constant the size of which is based on said difference and dividing said sum by said total number of acceptable active set sectors to obtain said updated rank.

7. The method of claim 3 wherein each neighbor sector has a combined carrier-to-interference ratio ("C/I") associated therewith, and wherein step (b) further comprises adding said neighbor sectors to said updated neighbor set in an order determined at least partially by said updated rank and said combined C/I until said updated neighbor set is full.

8. The method of claim 1 wherein said OWD threshold is programmable.

9. The method of claim 1 wherein the identity and rank of said neighbor sectors included in said individual neighbor sets are determined empirically.

10. In a code division multiple access ("CDMA") cellular telephone system, a method of optimizing an updated neighbor set used by a mobile unit during soft handoff thereof, the method comprising the steps of:

determining a one-way-delay ("OWD") for each sector with which said mobile unit is communicating, said sectors with which said mobile unit is communicating comprising a first active set;

creating a second active set comprising all sectors of said first active set having an OWD that is within a preselected OWD threshold, each of said second active set sectors having associated therewith an individual neighbor set comprising a list of neighbor sectors, each of said neighbor sectors having a rank within said individual neighbor set;

for each neighbor sector included in at least one of said individual neighbor sets:

determining a number indicating in how many of said individual neighbor sets said neighbor sector is included; and calculating an updated rank for said neighbor sector from said ranks of said neighbor sector within said individual neighbor sets; and adding said neighbor sectors to said updated neighbor set in an order determined at least partially by said updated rank until said updated neighbor set is full.

11. The method of claim 10 wherein said step of calculating comprises adding said ranks of said neighbor sector in said individual neighbor sets, said updated rank being equal to the sum of said ranks of said neighbor sector in said individual neighbor sets.

12. The method of claim 11 wherein said neighbor sectors are added to said updated neighbor set first in descending order of said determined number of individual neighbor sets and then in ascending order of said updated rank thereof.

13. The method of claim 12 wherein each of said neighbor sectors has associated therewith a combined carrier-to-interference ratio ("C/I"), and wherein said neighbor sectors are added to said updated neighbor set first in descending order of said determined number of individual neighbor sets, then in ascending order of said updated rank and then in descending order of associated combined C/I thereof.

14. The method of claim 10 wherein said step of calculating comprises computing an average of said ranks of said neighbor sector in said individual neighbor sets, said updated rank being equal to said average of said ranks of said neighbor sector in said individual neighbor set, and wherein said neighbor sectors are added to said updated neighbor list in ascending order of updated rank.

15. The method of claim 14 wherein said step of calculating further comprises:

calculating a difference between said determined number of individual neighbor sets and the number of sectors in said second active set;

if said difference is zero, averaging said ranks of said neighbor sector in said individual neighbor sets to obtain said updated rank; and if said difference is greater than zero, adding said ranks of said neighbor sector in said individual neighbor sets with a constant the size of which is based on said difference and dividing said sum by said total number of sectors in said second active set to obtain said updated rank;

wherein said neighbor sectors are added to said updated neighbor list in ascending order of updated rank.

16. In a code division multiple access ("CDMA") cellular telephone system, a computer program for optimizing an updated neighbor set used by a mobile unit during soft handoff thereof, the computer program stored on at least one computer readable medium and comprising:

instructions for determining a one-way-delay ("OWD") for each sector with which said mobile unit is communicating, said sectors with which said mobile unit is communicating comprising a first active set;

instructions for creating a second active set comprising all sectors of said first active set having an OWD that is within a preselected OWD threshold, each of said second active set sectors having associated therewith an individual neighbor set comprising a list of neighbor sectors, each of said neighbor sectors having a rank within said individual neighbor set; and instructions for forming an updated neighbor set for use by said mobile unit comprising at least one of said neighbor sectors.

17. The computer program of claim 16 wherein said instructions for forming said updated neighbor set further comprise:

instructions for selecting the one of said second active set sectors that has the shortest OWD; and instructions for causing said individual neighbor set of said selected second active set sector to be used as said updated neighbor set.

18. The computer program of claim 16 wherein within each of said individual neighbor sets, each of said neighbor sectors is assigned a rank, and wherein said instructions for forming said updated neighbor set further comprise:

instructions for determining a number indicating in how many of said individual neighbor sets said neighbor sector is included and for calculating an updated rank for said neighbor sector from said ranks of said neighbor sector within said individual neighbor sets for each neighbor sector included in at least one of said individual neighbor sets; and instructions for adding said neighbor sectors to said updated neighbor set in an order determined at least partially by said updated rank until said updated neighbor set is full.

19. The computer program of claim 18 wherein said instructions for calculating comprise instructions for adding said ranks of said neighbor sector in said individual neighbor sets, said updated rank being equal to the sum of said ranks of said neighbor sector in said individual neighbor sets.

20. The computer program of claim 18 wherein said instructions for calculating comprise instructions for computing an average of said ranks of said neighbor sector in said individual neighbor sets, said updated rank being equal to said average of said ranks of said neighbor sector in said individual neighbor sets.

21. The computer program of claim 20 wherein said instructions for calculating further comprise:

instructions for calculating a difference between said determined number of individual neighbor sets and the total number of said second active set sectors;

instructions for averaging said ranks of said neighbor sector in said individual neighbor sets to obtain said updated rank if said difference is zero; and instructions for adding said ranks of said neighbor sector in said individual neighbor sets with a constant the size of which is based on said difference and dividing said sum by said total number of second active set sectors to obtain said updated rank if said difference is greater than zero.

22. The computer program of claim 18 wherein neighbor sector has a combined carrier-to-interference ratio ("C/I") associated therewith, and wherein said instructions for calculating further comprise instructions for adding said neighbor sectors to said updated neighbor set in an order determined at least partially by said updated rank and said associated combined C/I until said updated neighbor set is full.

23. The computer program of claim 16 wherein said OWD threshold is programmable.

24. In a code division multiple access ("CDMA") cellular telephone system comprising a plurality of cells each divided into a plurality of sectors and served by a base station, said base stations establishing radio communications with a mobile unit for electrically connecting said mobile unit to a message switching center ("MSC") via a base station controller ("BSC"), apparatus for optimizing an updated neighbor set used by said mobile unit during soft handoff thereof, the apparatus comprising:

means for determining a one-way-delay ("OWD") for each sector with which said mobile unit is communicating, said sectors with which said mobile unit is communicating comprising a first active set;

means for creating a second active set comprising all sectors of said first active set having an OWD that is within a preselected OWD threshold, each of said second active set sectors having associated therewith an individual neighbor set comprising a list of neighbor sectors, each of said neighbor sectors having a rank within said individual neighbor set; and means for forming an updated neighbor set for use by said mobile unit comprising at least one of said neighbor sectors.

25. The apparatus of claim 24 wherein said means for forming further comprises:

means for selecting the one of said second active set sectors that has the shortest OWD; and means for causing said individual neighbor set of said selected second active set sector to be used as said updated neighbor set.

26. The apparatus of claim 24 wherein within each of said individual neighbor sets, each of said neighbor sectors is assigned a rank, and wherein said means for forming further comprises:

means for determining a number indicating in how many of said individual neighbor sets said neighbor sector is included and for calculating an updated rank for said neighbor sector from said ranks of said neighbor sector within said individual neighbor sets for each neighbor sector included in at least one of said individual neighbor sets; and means for adding said neighbor sectors to said updated neighbor set in an order determined at least partially by said updated rank until said updated neighbor set is full.

27. The apparatus of claim 26 wherein said means for calculating comprises means for adding said ranks of said neighbor sector in said individual neighbor sets, said updated rank being equal to the sum of said ranks of said neighbor sector in said individual neighbor sets.

28. The apparatus of claim 26 wherein said means for calculating comprises means for computing an average of said ranks of said neighbor sector in said individual neighbor sets, said updated rank being equal to said average of said ranks of said neighbor sector in said individual neighbor sets.

29. The apparatus of claim 28 wherein said means for calculating further comprises:

means for calculating a difference between the number of individual neighbor sets in which said neighbor sector is included and the total number of said second active set sectors;

means for averaging said ranks of said neighbor sector in said individual neighbor sets to obtain said updated rank if said difference is zero; and means for adding said ranks of said neighbor sector in said individual neighbor sets with a constant the size of which is based on said difference and dividing said sum by said total number of second active set sectors to obtain said updated rank if said difference is greater than zero.

30. The apparatus of claim 26 wherein neighbor sector has a combined carrier-to-interference ratio ("C/I") associated therewith, and wherein said means for calculating further comprises means for adding said neighbor sectors to said updated neighbor set in an order determined at least partially by said updated rank and said associated combined C/I until said updated neighbor set is full.

31. The apparatus of claim 24 wherein said OWD threshold is programmable.

* * * * *